T. JONES & L. J. EVANS.
EMERGENCY BRAKE.
APPLICATION FILED SEPT. 3, 1909.

974,390.

Patented Nov. 1, 1910.
2 SHEETS—SHEET 1.

Witnesses—

Inventors
Thomas Jones
Lewis John Evans
by
Attorney.

T. JONES & L. J. EVANS.
EMERGENCY BRAKE.
APPLICATION FILED SEPT. 3, 1909.

974,390.

Patented Nov. 1, 1910.
2 SHEETS—SHEET 2.

Witnesses—
Stanley Wood
Henry William Blake

Inventors.
Thomas Jones
Lewis John Evans.
by
Attorney.

UNITED STATES PATENT OFFICE.

THOMAS JONES AND LEWIS JOHN EVANS, OF YNISCEDWYN, YSTRADGYNLAIS, ENGLAND.

EMERGENCY-BRAKE.

974,390.  Specification of Letters Patent.  Patented Nov. 1, 1910.

Application filed September 3, 1909.  Serial No. 516,120.

*To all whom it may concern:*

Be it known that we, THOMAS JONES and LEWIS JOHN EVANS, subjects of the King of Great Britain and Ireland, both residing at Rose Cottage, Yniscedwyn, Ystradgynlais, Swansea Valley, Wales, England, have invented a certain new and useful Emergency-Brake, of which the following is a specification.

This invention relates to emergency brakes for electric tramcars, locomotives, railway carriages and wagons and other vehicles of the type in which a centrifugal governor is caused to actuate the brakes of the vehicle when attaining excessive speed through the medium of a clutch which brings into operation the braking mechanism and has for its object to provide an emergency brake of this type in which the clutch operated by the governor is caused to apply a skid or roadway brake at the same time that the wheel brakes are applied, also to provide means to prevent the brakes from being actuated due to the vibration or jolting of the car.

According to the invention we provide a governor which is in connection with the wheels of the vehicle and which, upon the vehicle reaching too high a speed, operates mechanism for bringing the brakes into action.

According to the invention we provide a clutch, one clutch member being loosely mounted upon a shaft and brought into contact with the other clutch member by the governor when an excessive speed is obtained.

According to the invention we also provide means whereby the clutch members are prevented from engaging one another on the vibration of the vehicle.

According to the invention, we also provide means in connection with the clutches aforesaid for releasing a catch preventing the brake from operating.

The accompanying drawing illustrates a constructional form of this invention.

Figure 1:
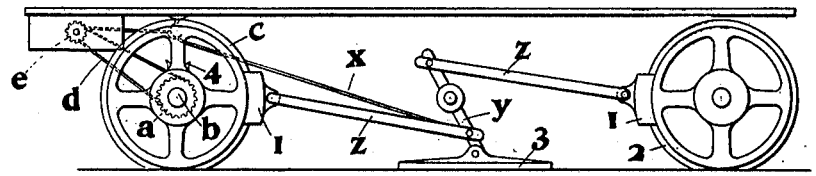
Figure 2:
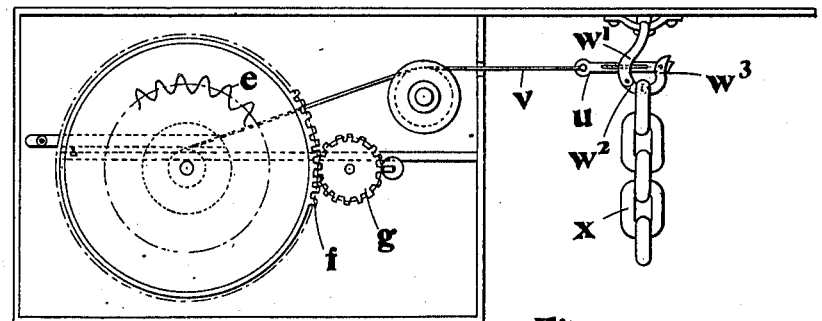
Figure 3:
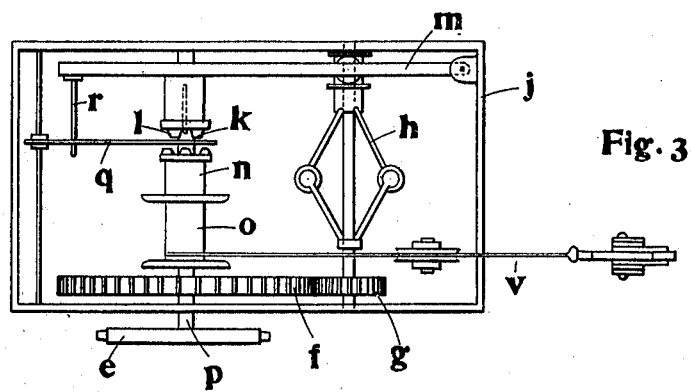
Figure 4:
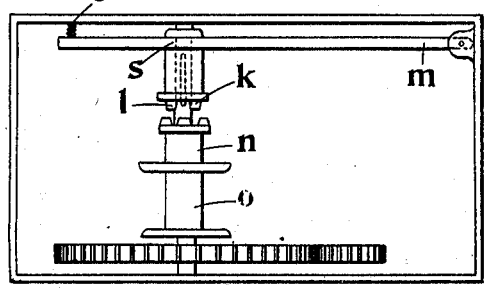
Figure 5:
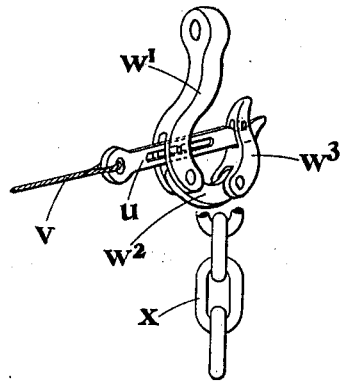
Figure 6:
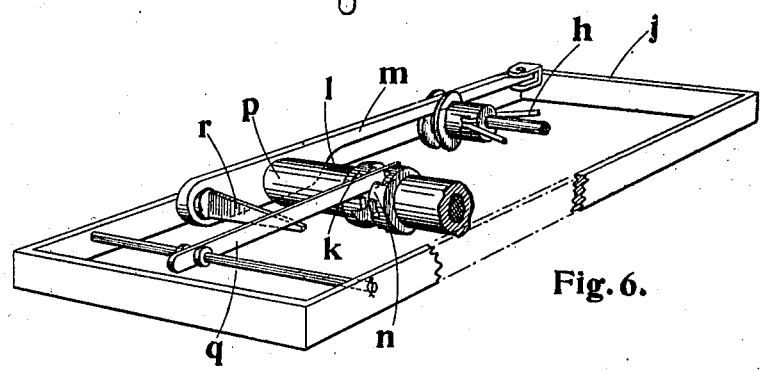
Figure 7:
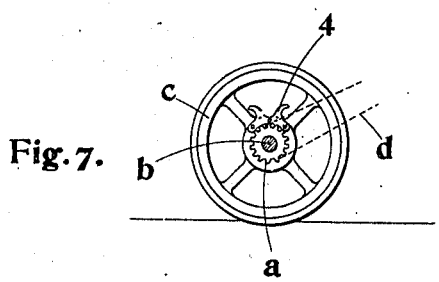

Figure 1 is a side elevation of the device as applied to a vehicle. Fig. 2 is a side elevation of the releasing mechanism. Fig. 3 is a plan of the releasing mechanism and Fig. 4 is a modified form of releasing mechanism. Figs. 5, 6 and 7 are details to a larger scale.

In carrying the invention into effect we provide a sprocket wheel $a$ on the axle $b$ of the wheel $c$. This sprocket wheel $a$ drives by means of a chain $d$ a second sprocket wheel $e$ which, through the medium of toothed wheels $f$, $g$ drives a governor $h$ adjusted for a certain speed and mounted within a dust proof casing $j$ mounted upon the vehicle frame. The governor $h$ operates a clutch member $k$ sliding by means of a feathered key $l$ on a shaft $p$, by means of a lever $m$. This clutch $k$ is adapted on the vehicle attaining an excessive speed, to engage with a second clutch member $n$ connected to a drum $o$ and loosely mounted upon the shaft $p$ aforesaid.

To prevent the clutches from being brought into engagement by the vibration of the vehicle, we provide within the casing a pivoted lever $q$ which, during the ordinary running of the vehicle, projects between the two clutch members $k$ $n$ thus preventing these from engagement with one another. When the vehicle attains an excessive speed, the pivoted lever $q$ is raised from between the two clutch members $k$ $n$ by a tapered arm $r$ provided on the lever $m$ operating the movable clutch $k$. It will however be understood that instead of using the pivoted lever and the tapered arm we may provide the movable clutch member $k$ $l$ (Fig. 4) with a recess $s$ into which fits the lever $m$ operated by the governor. This lever $m$ is held in its inoperative position by a spring $t$ acting upon the free end of the said lever $m$.

Outside the dust proof casing $j$ and supported by any suitable means not shown is a hook or catch $u$, which may consist of a metal rod or bar in one end of which is provided a notch, in which rests a short rod attached to the extremity $w^3$ of a hook comprised of a number of parts $w^1$, $w^2$, $w^3$, pivoted together, said parts being held in position by the catch $u$ so that the hook is capable of supporting a heavy chain $x$, which is connected to a double armed lever $y$ pivoted to the vehicle frame, the other end of the hook $u$ being connected to the drum $o$ by a chain $v$ or the like. The ends of this double armed lever $y$ are connected by rods $z$ to the brake blocks 1 which are in contact with the vehicle wheels $c$, 2. The double armed lever $y$ may have one of its arms prolonged and formed into a skid 3 adapted to come into contact with the rails.

On the axle $b$ of the wheel $c$ is provided a double ended hook 4 adapted to catch either way the chain x when this latter is released from the hook.

What we claim as our invention and desire to secure by Letters Patent is:—

1. An emergency brake comprising brake blocks for engaging with the vehicle wheels, brake blocks for engaging with the track, a shaft, means connecting said shaft to the wheel axle, two clutch members mounted on said shaft, one of said clutch members being rotatably mounted on said shaft and the other being slidably mounted thereon, a second shaft, a governor mounted on said shaft, means connecting said shafts together, a barrel secured to the rotatably mounted clutch member, a hook composed of three parts, a slide bar engaging said hook, a cord connecting said slide bar to the barrel, a chain hanging in said hook and connected to the brake blocks aforesaid, and a double ended hook mounted upon the wheel axle substantially as described.

2. An emergency brake comprising brake blocks for engaging with the vehicle wheels, brake blocks for engaging with the track, a shaft, means connecting said shaft to the wheel axle, two clutch members mounted on said shaft, one of said clutch members being rotatably mounted on said shaft and the other being slidably mounted thereon, a second shaft, a governor mounted on said shaft, means connecting said shafts together, a barrel secured to the rotatably mounted clutch member, a hook composed of three parts, a slide bar engaging said hook, a cord connecting said slide bar to the barrel, a chain hanging in said hook and connected to the brake blocks aforesaid, and a double ended hook mounted upon the wheel axle and means for preventing the operation of the device by the vibration of the vehicle if the required speed has not been reached substantially as described.

3. An emergency brake comprising brake blocks for engaging with the vehicle wheels, brake blocks adapted to engage the track, clutch mechanism connected to the wheel axles, a governor controlling said clutch mechanism and means connecting said clutch mechanism to the brake blocks, a pivotally mounted lever normally resting between the clutch members, a second pivotally mounted lever connected to the governor, a wedge-shaped member provided on the second pivoted member and adapted to engage with the underside of the first pivoted member, and means for retaining the second pivoted member in the normal position substantially as described.

4. An emergency brake comprising brake blocks for engaging with the vehicle wheels, brake blocks for engaging with the track, a shaft, means connecting said shaft to the wheel axle, two clutch members mounted on said shaft, one of said clutch members being rotatably mounted on said shaft and the other being slidably mounted thereon, a second shaft, a governor mounted on said shaft, means connecting said shafts together, a barrel secured to the rotatably mounted clutch member, a hook composed of three parts, a slide bar engaging said hook, a cord connecting said slide bar to the barrel, a chain hanging in said hook and connected to the brake blocks aforesaid, and a double ended hook mounted upon the wheel axle, a pivotally mounted lever normally resting between the clutch members, a second pivotally mounted lever connected to the governor, a wedge shaped member provided on the second pivoted member and adapted to engage with the underside of the first pivoted member and means for retaining the second pivoted member in the normal position substantially as described.

In testimony whereof we have hereunto signed our names to this specification in the presence of two subscribing witnesses.

THOMAS JONES.
LEWIS JOHN EVANS.

Witnesses:
HOWEL WALTERS,
THOMAS EVANS.